(12) United States Patent
Duprey et al.

(10) Patent No.: US 7,865,677 B1
(45) Date of Patent: Jan. 4, 2011

(54) ENHANCING ACCESS TO DATA STORAGE

(75) Inventors: Dennis T. Duprey, Raleigh, NC (US);
Earle T. MacHardy, Jr., Durham, NC (US)

(73) Assignee: EMC Corporation, Hopkinton, MA (US)

( * ) Notice: Subject to any disclaimer, the term of this patent is extended or adjusted under 35 U.S.C. 154(b) by 624 days.

(21) Appl. No.: 11/477,965

(22) Filed: Jun. 29, 2006

(51) Int. Cl.
*G06F 12/06* (2006.01)
(52) U.S. Cl. .............. 711/162; 711/202; 711/E12.002
(58) Field of Classification Search .............. None
See application file for complete search history.

(56) References Cited

U.S. PATENT DOCUMENTS

| | | | | |
|---|---|---|---|---|
| 7,111,137 B2 * | 9/2006 | Chong, Jr. | ............. | 711/162 |
| 2003/0182501 A1 * | 9/2003 | George et al. | ............. | 711/114 |

* cited by examiner

*Primary Examiner*—Reginald G Bragdon
*Assistant Examiner*—Eric Loonan
(74) *Attorney, Agent, or Firm*—Krishnendu Gupta; Jason A. Reyes; Phillip W. Citroen

(57) ABSTRACT

Access to data storage is enhanced. A logical volume defines a set of block based data storage resources and is presented as a first volume. A virtual LUN portal mechanism serves as an alias for the first volume and is presented as a second volume. A block based data manipulation mechanism is configured to apply to a first I/O request directed to the second volume and not to a second I/O request directed to the first volume.

28 Claims, 8 Drawing Sheets

ENHANCING ACCESS TO DATA STORAGE

FIELD OF THE INVENTION

The invention relates generally to data storage and more specifically to enhancing access to data storage.

BACKGROUND OF THE INVENTION

Computer systems may include different resources used by one or more host processors. Resources and host processors in a computer system may be interconnected by one or more communication connections. These resources may include, for example, data storage systems, such as the Symmetrix™ or CLARiiON™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual physical disk drives. Allowing multiple host systems to access the single storage device unit allows the host systems to share data stored therein.

It is desirable to copy or replicate data for a variety of different reasons, such as, for example, database-related data may be critical to a business so it is important to make sure is not lost due to problems with the computer systems, such as for example, a software virus that corrupts the data. Typically, there are costs associated with backing up or otherwise copying or replicating data.

For example, a file server is a computer that provides file services relating to the organization of information on storage devices, such as disks. The file server includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A file server may be further configured to operate according to a client/server model of information delivery to thereby allow many clients to access files stored on a server. In this model, the client may comprise an application, such as a database application, executing on a computer that "connects" to the file server over a direct connection or computer network, such as a point-to-point link, shared local area network (LAN), wide area network (WAN), or virtual private network (VPN) implemented over a public network such as the Internet. Each client may request the services of the file system on the file server by issuing file system protocol messages (in the form of packets) to the file server over the network.

A common type of file system is a "write in-place" file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block. Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Disk storage is typically implemented as one or more storage "volumes" that comprise physical storage disks, defining an overall logical arrangement of storage space. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. A RAID 4 implementation specifically entails the striping of data across a group of disks, and separate parity caching within a selected disk of the RAID group.

More particularly, RAID groups are logical representations of disk arrays created by binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes.

Applications access and store data incrementally by use of logical storage array partitions, known as logical units (LUNs). LUNs are exported from a RAID array for use at the application level. For conventional systems, LUNs always map to logically provisioned contiguous storage space within the RAID groups. This contiguous provisioning results from the fact that traditional LUN mapping technologies bind LUNs from RAID groups using static mapping. Static mapping provides that a LUN is defined by a start position in a RAID group and that the LUN extends for its size from that position contiguously in the RAID group's address space. This static mapping yields a logical unit mapping of 1:1 for logical to contiguous mapping of blocks from some start point in the RAID group's address space.

In order to improve reliability and facilitate disaster recovery in the event of a failure of a file server, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or its infrastructure (e.g., a flood, power outage, act of war). The mirror is updated at regular intervals, typically set by an administrator, in an effort to catch the most recent changes to the file system traded off against cost.

The complete recopying of the entire file system to a remote (destination) site over a network may be quite inconvenient where the size of the file system is measured in tens or hundreds of gigabytes (even terabytes). This full-backup approach to remote data replication may severely tax the bandwidth of the network and also the processing capabilities of both the destination and source file server.

SUMMARY OF THE INVENTION

Access to data storage is enhanced. A logical volume defines a set of block based data storage resources and is presented as a first volume. A virtual LUN portal mechanism serves as an alias for the first volume and is presented as a second volume. A block based data manipulation mechanism is configured to apply to a first I/O request directed to the second volume and not to a second I/O request directed to the first volume.

One or more implementations of the invention may provide one or more of the following advantages.

Conventionally administered block based data storage system based replication can be provided for server defined data objects (e.g., files within a file system, file systems within a volume, volumes within a disk device) without requiring the storage system to rely on information about the server defined data objects.

A server can identify a data object context within a LUN without requiring any modification to existing data within the LUN. Replication can be performed at a server defined level of granularity on a block based data storage system.

Other advantages and features will become apparent from the following description, including the drawings, and from the claims.

DETAILED DESCRIPTION

Figure 1:
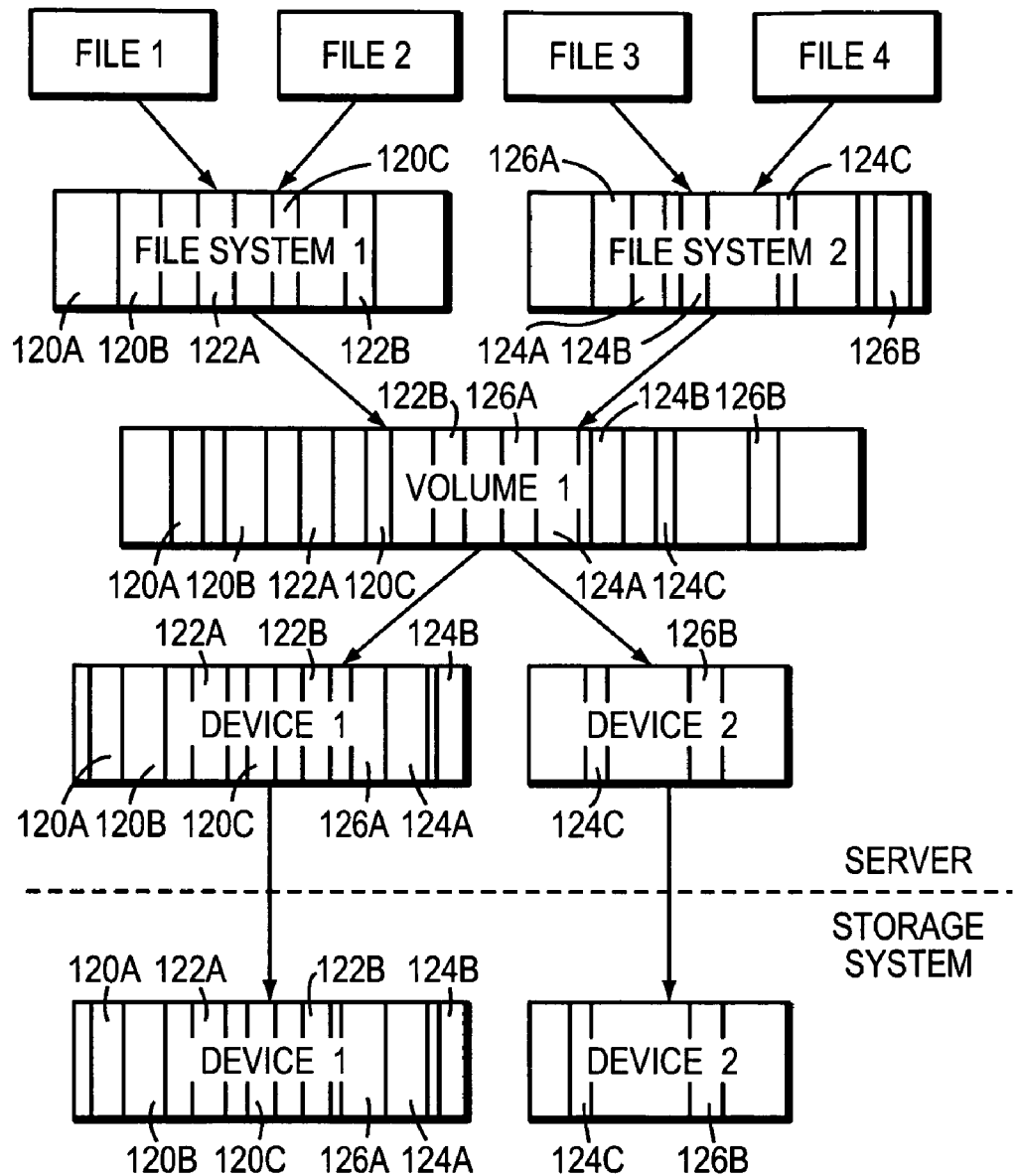
FIGS. 1-2 are block diagrams of server-storage system interactions.

A mechanism described below allows block storage system based replication for server defined data objects (e.g., files within a file system, file systems within a server volume, server volumes within a disk device) without requiring the storage system to be provided with information about the server defined data objects.

Conventionally, block storage system replication is performed at the storage system volume (LUN) level. The entire LUN is replicated regardless of how the server is using the LUN. LUN based replication causes costs in performance to the LUN and in network usage when the entire LUN is remotely replicated, as opposed to only the specific server defined data objects that reside on the LUN. In at least some cases it is desirable to replicate at a finer level of granularity than can be achieved by conventional block storage system LUN replication.

Server-based replication provides server defined data object granularity, but incurs the burden, in terms of consuming server CPU and I/O resources, for maintaining the replicas (as opposed to block based storage system replication). Also, in a heterogeneous operating environment (e.g., Windows, Linux), with different applications (e.g., Oracle, Exchange) a different replication management product may be required to be deployed for each application which requires the user to learn and manage the different replication management products. In contrast, storage system replicas have a common management regardless of the operating environment. In addition, server replication products are typically licensed per server, which favors storage array replication licensing.

At least some implementations of the methods and apparatus of the present invention are intended for use in Storage Area Networks (SANs) and Network Attached Storage (NAS) networks that include data storage systems, such as the Symmetrix Integrated Cache Disk Array system or the CLARiiON Disk Array system available from EMC Corporation of Hopkinton, Mass. and those provided by vendors other than EMC.

Generally such a data storage system includes a system memory and sets or pluralities of multiple data storage devices or data stores. The system memory can comprise a buffer or cache memory; the storage devices in the pluralities can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end. Each LUN acts as a virtual disk that may be presented for access to one or more host computers for I/O operations. Regarding terminology, "LUN" as used herein may refer to a single LUN or a virtual LUN such as a meta-LUN or multi-LUN derived from multiple actual LUNs or other virtual LUNs. A bus interconnects the system memory, and communications with front and back end.

All or some of the methods and apparatus of this invention may take the form of program code (i.e., instructions) embodied in tangible media, such as floppy diskettes, CD-ROMs, hard drives, random access or read only-memory, or any other machine-readable storage medium, including transmission medium). When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

In accordance with the invention as described below, a user can partition data objects on a server and have a block storage system replicate only the server-defined data objects as opposed to entire LUNs.

As noted above, a server partitions LUNs into data objects by definition. Server-defined data objects may include pieces of LUNs, file systems, and files. In at least some implementations, a block-based storage system (e.g., CLARiiON, Symmetrix, EVA) operates strictly on the LUNs. The block-based storage system replicates data contained within a LUN without any reference to the way in which the LUN is in fact being used (e.g., by the server) or to the server-defined data objects it contains.

It is desirable to replicate server-defined data objects using storage system based replication for multiple reasons, including for unified replication management across a heterogeneous server environment, for off-loading server I/O cycles to the storage system, and for reduced software license costs (per server vs. per storage system licensing). For example, a user may create a small number of LUNs per server on the block-based storage system and use a server-based volume manager to break the LUNs down into smaller partitions. One or more file systems can be created on each partition, and many data objects can be created in each file system. The user may wish to replicate some but not all of the file systems which exist on a single underlying LUN on a storage system.

In accordance with the invention, aliasing functionality referred to as a virtual LUN portal allows a storage administrator to create one or more alternate paths associated with the same LUN. Each virtual LUN portal can have one or more storage system replication features (e.g., mirrors, clones, snapshots) applied to it. Each virtual LUN portal interoperates as a different LUN to the server but uses the same underlying storage, i.e., the LUN associated with the virtual LUN portal, and therefore serves as an alias for the associated LUN. In at least some implementations, input/output requests (I/Os) sent to the virtual LUN portal may have any or all replication features applied to them. For example, writes to a virtual LUN portal that has mirroring applied to it are mirrored to a remote storage system, whereas writes through the associated LUN, or a different virtual LUN portal, are not mirrored. This approach allows a server to indicate to the storage system which I/Os should be replicated (or treated differently) within the same LUN. In this way a server can identify I/Os specific to server-defined data objects to the storage system and have the storage system treat I/Os accordingly.

This approach is also suitable for other block storage system based features such as quality of service (QOS) in which a server-defined data object may have an I/O service level requirement with respect to bandwidth and latency. It is also suitable for block-based storage performance analysis tools that typically operate at a LUN level. Using this approach, I/Os to a server-defined data object contained within a LUN can be distinguished from I/Os to the same LUN which were not associated with the data object of interest.

In addition, this approach is suitable for other storage mechanisms that logically reside between the storage system and the server. For example, a Network Attached Storage (NAS) device may use a block-based back-end storage system for both files and devices. Also, virtual servers typically map disk devices into a common file system (wherein each file represents a device) for each guest operating system that uses the virtual server.

Since servers define the storage used for files, file systems, server volumes and disk devices, file systems can be built on server volumes or disk devices. Typical conventional block storage systems do not have or use any information about how the server lays out the files, file systems, or server volume pieces on the storage it provides. Keeping track of the server-defined data object layout in a block storage system can be problematic; for example, the definition may change with each operating system and server volume manager release.

FIG. 1 illustrates an example of a server and storage system data objects. In the example, files File1 through File4 are allocated from file systems in fixed sized non-contiguous blocks 120A-120C, 122A-122B, 124A-124C, 126A-126B. In File system 1, blocks 120A-120C associated with File1 and blocks 122A-122B associated with File2 are interspersed within the logical address space of the file system. File system 1 and File system 2 are built on a common server volume (Volume 1). Two disk devices (Device 1 and Device 2) are concatenated together under Volume 1 to provide the storage for both file systems. The size of the disk devices can be variable. In this example Device 1 is larger than Device 2. Device 1 contains all of File system 1 and parts of File system 2. A volume manager can also stripe the data across server volume pieces (not shown) which increases the complexity of information about where the data for a file or file system is located. Also, a single file system can span multiple LUNs (not shown). In all cases there is a one-to-one mapping of the disk devices to the LUNs on the storage system (LUNs allocated from a storage system show up as disk devices on the server).

A virtual server system (e.g., from VMware) typically represents virtual LUNs to a guest operating system using a special purpose file system within the virtual server operating system. A NAS storage system also provides block access to virtual LUNs within the NAS file system. In both of these cases, each virtual device is allocated as a file. An extended version of the example is illustrated in FIG. 2 which shows a virtual server data layout.

Figure 2:
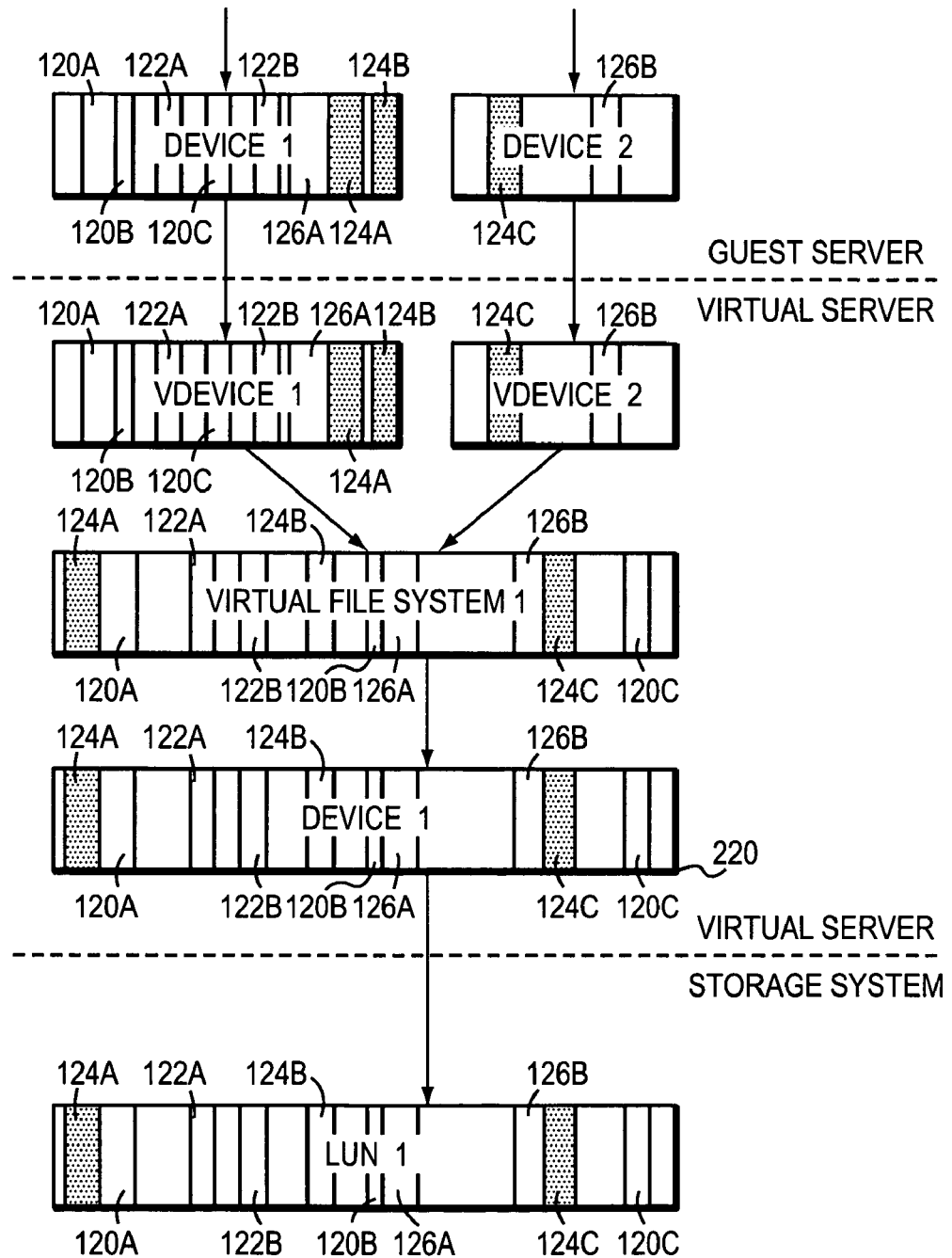

With respect to FIG. 2, server-defined disk devices Device 1 and Device 2 have the same server-defined objects from FIG. 1 logically above them. The virtual server layer maintains virtual disk devices as files. A NAS storage system may do the same when it provides block storage access in addition to file access. The block allocations of the virtual disk devices within the virtual file systems do not correspond to the relative blocks offsets within the virtual disk device, similar to the way in which file allocations were interspersed in FIG. 1. The virtual file systems can be built on one or more disk devices (only one disk device 220 is shown in FIG. 2). Each disk device has a one-to-one relationship with a block storage system LUN.

With respect to data object access and alignment, application programs access data in bytes from 1 byte in length to many megabytes (MBs) in length at varying unaligned file offsets; however, server operating systems service application I/O requests using fixed size I/Os or multiples of a fixed size I/O. The fixed I/O size is often referred to as a page size.

4 KB or 8 KB is a standard page size for many file systems and databases. Server-defined data objects start and end on page boundaries. For example, a small file that has a length of 1 byte consumes a page of file system space. Each page is to aligned at an offset within the file system that is a multiple of the page size. Some operating systems have mechanisms to align the server-defined data object allocations within a disk device (LUN) such that the offset of any page from the start of the LUN is a multiple of the page size.

Similarly, virtual file systems representing virtual disk devices are also accessed using fixed page sizes. Typically the page size used by a virtual server is much larger than server-defined page sizes due to efficiency and recovery simplicity.

Figure 3:
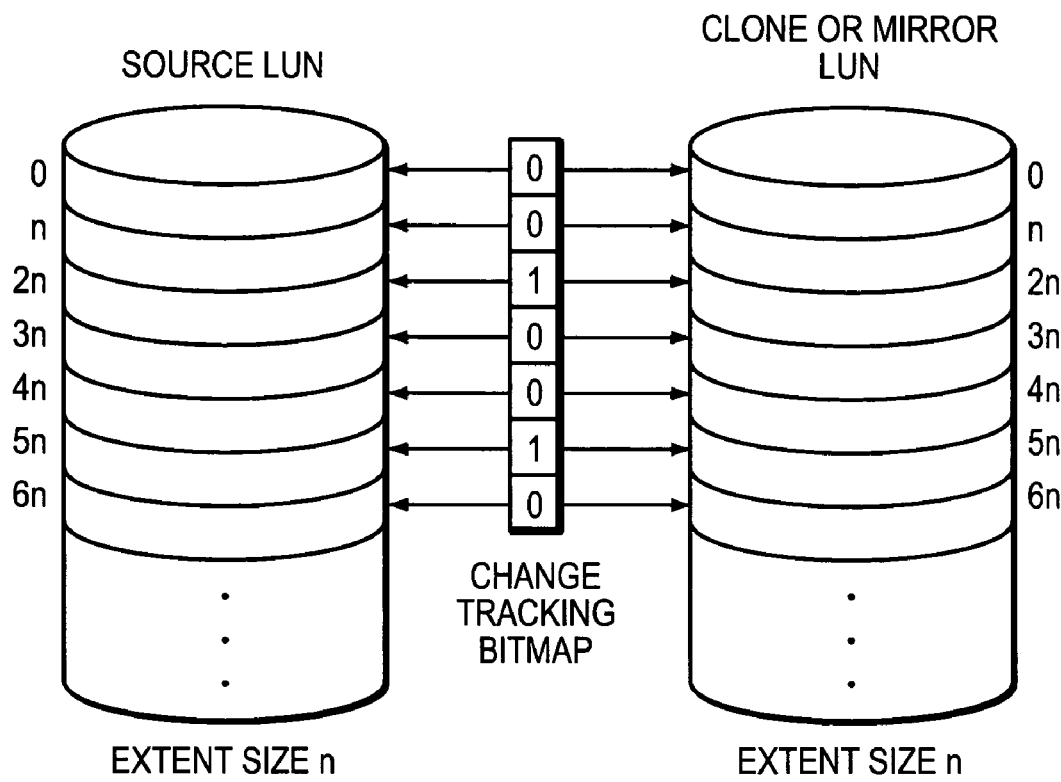
FIGS. 3-4 are block diagrams of aspects of data replication in a storage system.

FIG. 3 illustrates an example of clone or mirror replication. With respect to storage system LUN replication, for performance and resource consumption reasons, storage system replication typically operates on fixed size extents of data residing on a LUN being replicated. Extents typically range from 512 bytes (a disk sector) to multiple MBs. For example, keeping track of the regions of a LUN that have changed in order to provide incremental updates to a local or remote replica of the LUN (clone or mirror) may be done on an extent basis using a bitmap. Each bit in the bitmap represents an extent in the LUN. A set bit indicates that data in the corresponding extent was modified. The size of an extent is sometimes referred to as the granularity of change tracking.

Figure 4:
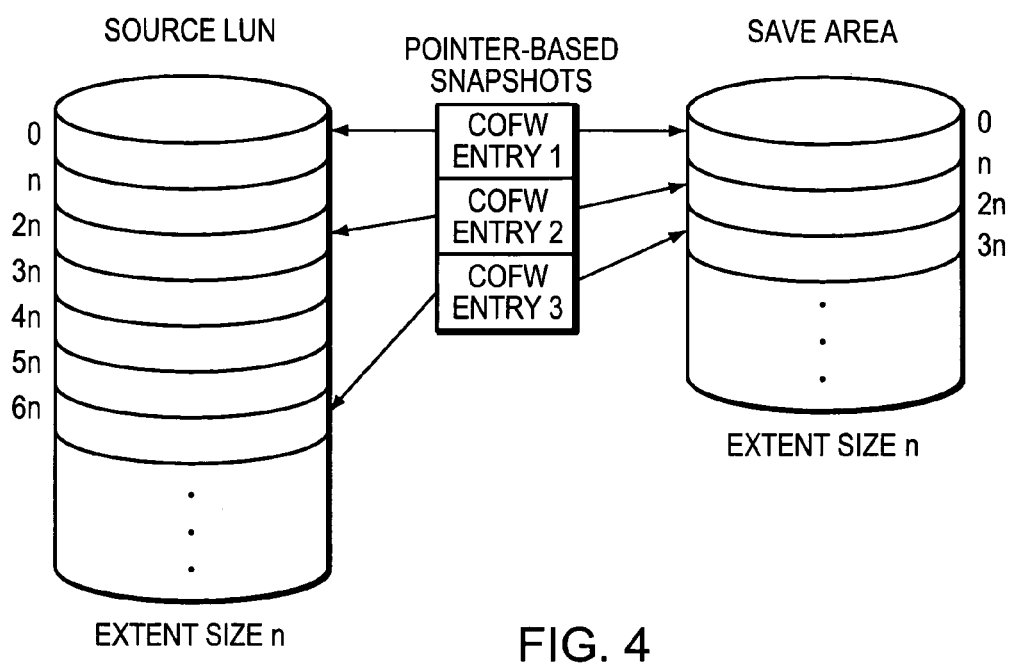

Other replication features, such as snapshots, perform copy on first write (COFW) on full extents. For example, a write request of size m that is smaller than an extent size of n causes a read of size n aligned on an extent boundary and a write to a save area (reserved storage for the COFW data) of size n before the write request of size m is written to the LUN. If the size of the write is larger than the extent size, more than one COFW may be required; however, all COFWs are aligned on extent boundaries as shown in FIG. 4 which illustrates pointer-based snapshot replication.

In at least some implementations, storage system replication supports a rollback or a reverse copy from the replica to the source LUN as a method for recovery. Some storage systems offer this capability while the source LUN is on-line (servicing I/Os). As described below, in at least some cases, both the alignment and size of the extents used for storage system replication are critical in order to provide storage system replication recovery of server-defined data objects. Many block storage systems have a means for allowing the storage system administrator to set an offset which aligns the server-defined data objects to LUN extent boundaries to optimize performance. Using an alignment mechanism, either server-based or storage system-based, helps to ensure that I/O access to server-defined data object aligns on a multiple of the LUN extent size.

Figure 5:
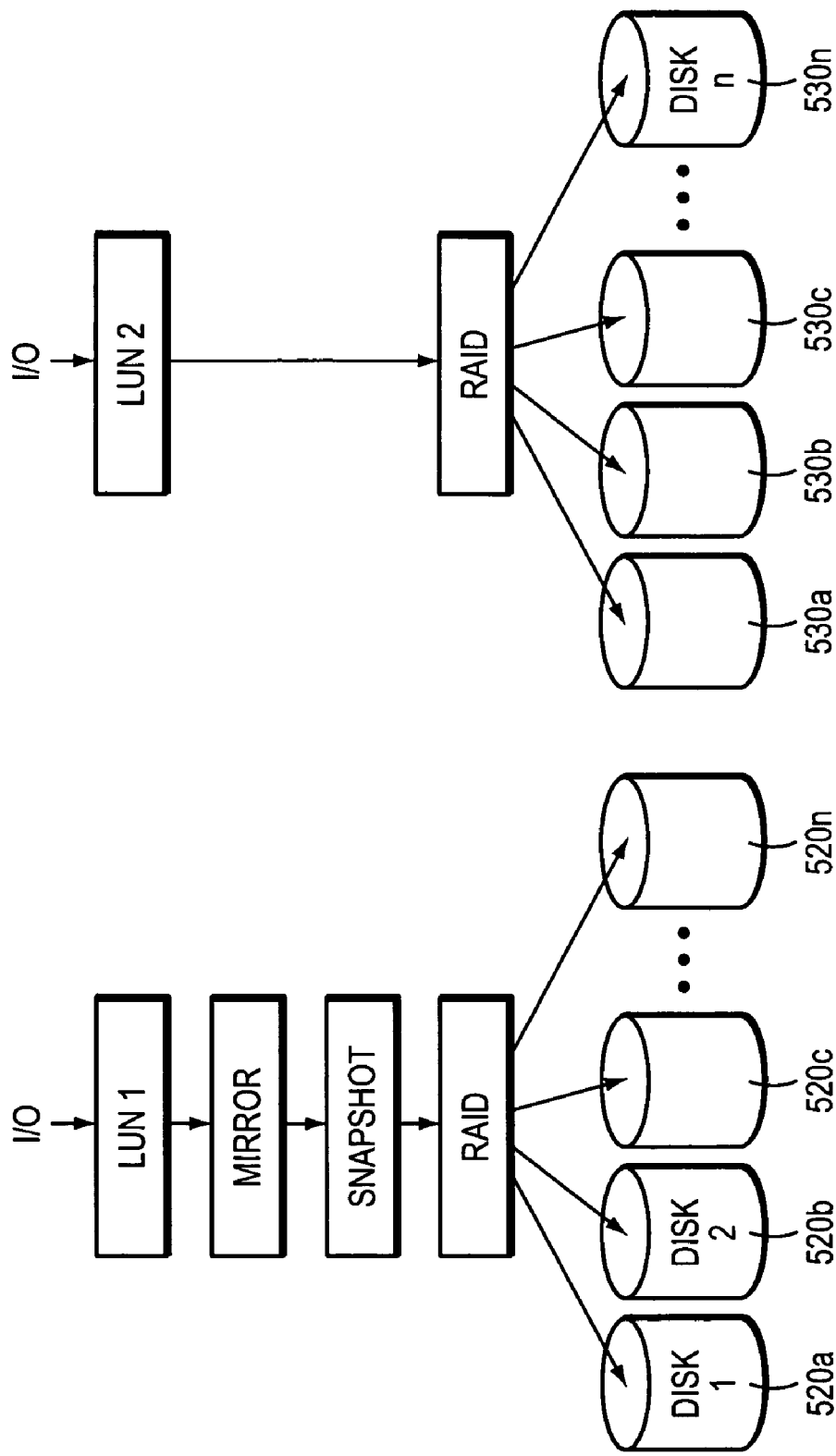
FIGS. 5-8 are block diagrams of aspects of LUN-based storage systems.

Block storage system replication is performed on a LUN basis. Users can select which LUNs have a replication feature applied on them and which LUNs do not. Replication adds overhead in both the amount of storage needed to maintain the replica (and any meta-data structures such as COFW entries and change tracking) and in the performance of the source LUN being replicated. Many block storage systems support more than one replication feature on a single LUN (e.g., snapshot and mirror). These replication features can be considered to be layered upon one another in an example illustrated in FIG. 5 showing LUN replication features. In the example, each LUN is shown using separate disks (LUN 1 using disks 520a-520n and LUN 2 using disks 530a-530n); however, the physical disks may be shared, i.e., multiple LUNs can be stored on the same physical disks.

In accordance with the invention, a technique and a mechanism may be provided in which one or more virtual LUN portals may be created and associated with any LUN. One or more virtual LUN portals are created for each server-defined object for which block storage system replication is desired. Each virtual LUN portal interoperates as a LUN when accessed outside the storage system, and has a unique identifier (WWN and LUN number). Each virtual LUN portal can be LUN masked and assigned to any storage system attached server or to another storage system (for remote replication), and inherits LUN properties (including geometry and LUN ownership in active-passive storage systems) from its associated LUN.

Figure 6:
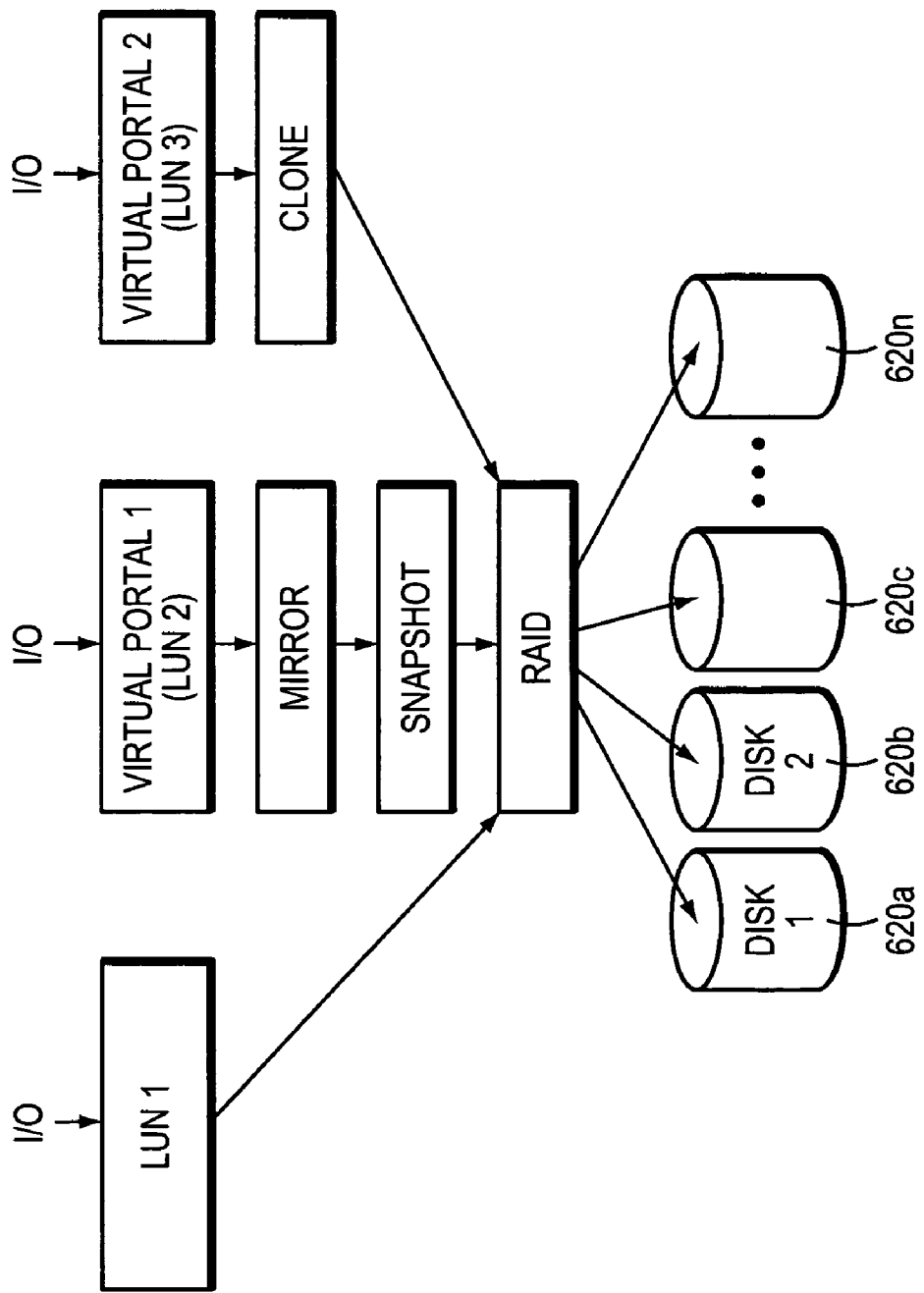

FIG. 6 illustrates an example in which two virtual LUN portals (Virtual Portal 1 serving as LUN 2, and Virtual Portal 2 serving as LUN 3) are associated with LUN 1. Each virtual LUN portal may have one or more replication features enabled in the same manner as if the virtual LUN portal were a LUN. In this example, Virtual Portal 1 has mirror and snapshot replication and Virtual Portal 2 has clone replication enabled. I/O issued to any of the virtual LUN portals associated with LUN 1 goes to the same underlying physical storage as LUN 1, i.e., disks 620a-620n.

The virtual LUN portal mechanism enables servers, virtual servers, and NAS storage systems to replicate based on server-defined objects without incurring the overhead of replicating the entire LUN or LUNs.

Figure 7:
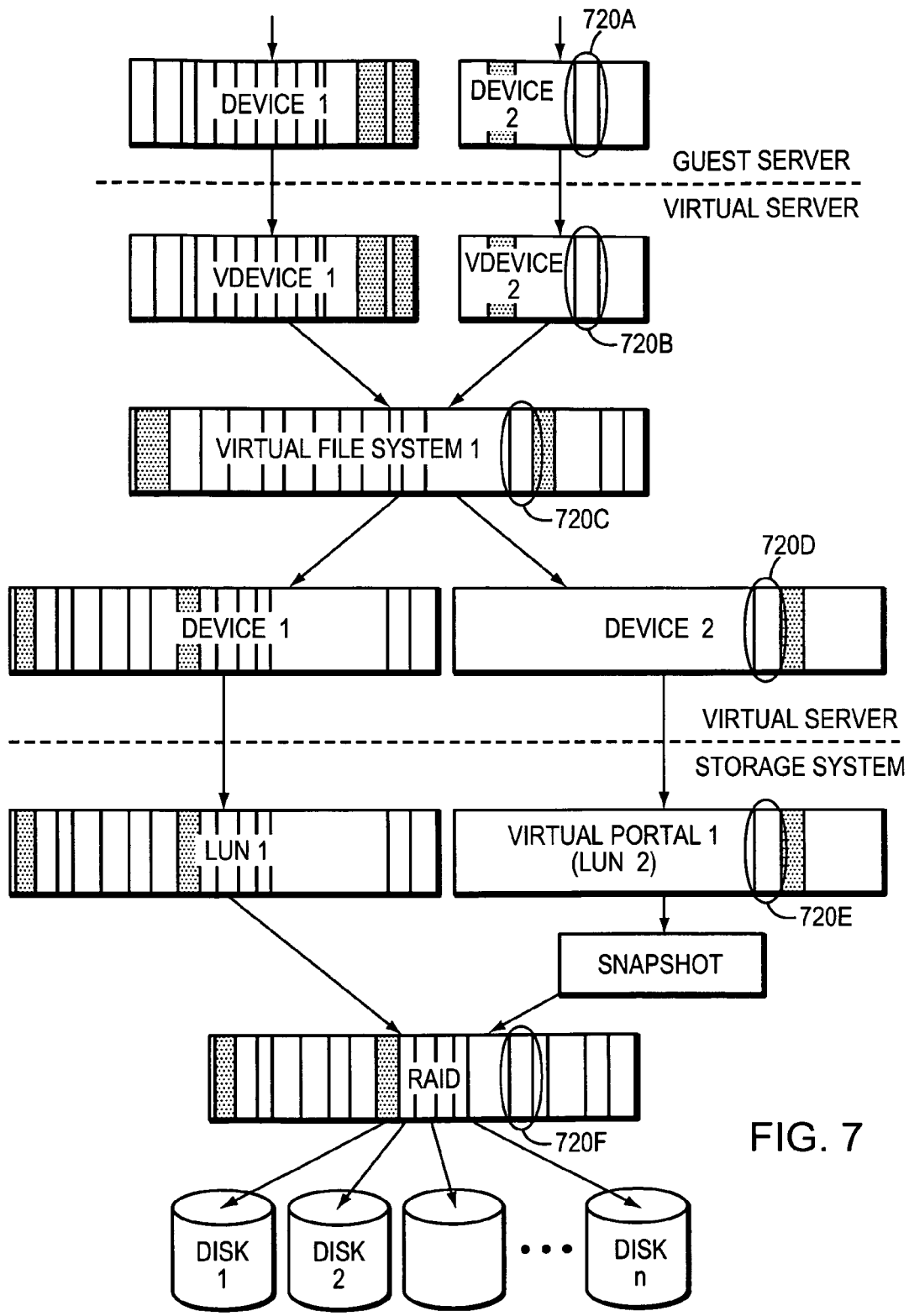

With respect to a replication example illustrated in FIG. 7, because LUNs are a scarce storage system resource, the relatively small number of server-defined data objects (typically virtual disk devices) used by a virtual server or NAS storage system makes such an environment a particularly suitable candidate for use of the virtual LUN portal technique. Replicating files from a server using storage system replication is feasible using this technique; however, in at least some implementations, the number of files thus replicated would need to be limited, e.g., to large files such as databases that reside in the same server-defined file system as other files.

In the example illustrated in FIG. 7, a virtual LUN portal is created for Vdevice 2 to enable replication on Vdevice 2. From the virtual server perspective, the virtual LUN portal interoperates as a standard LUN and shows up as a disk device (Device 2). The virtual server associates Device 2 with the file that represents Vdevice 2 such that any I/Os to Vdevice 2 are sent to Device 2. Once this association is set up (in at least some implementations this can be done on-line with respect to I/Os from the server), storage system replication (or QOS or performance analysis) can be accomplished on Vdevice 2 independently from Vdevice 1. The example shows data pages written to Vdevice 2 from the server being sent to Device 2 (Virtual Portal 1) and not sent through LUN 1. In at least some implementations, if Virtual Portal 1 did not have any replication feature applied to it, the resultant storage would be exactly the same as if the virtual LUN portal were not used. The creation of a virtual LUN portal allows the storage administrator to perform LUN based replication (a standard storage system replication operation) on the data written to the virtual LUN portal. Ovals 720A-720F in FIG. 7 trace the data page written to Device 2 from the server.

In the example of FIG. 7, the storage administrator set up snapshot replication which involves COFW processing. COFWs only occur on data pages written through Virtual Portal 1. By using the virtual LUN portal mechanism, the virtual server is able to replicate Vdevice 2 using storage system replication even though both Vdevice 1 and Vdevice 2 are in a shared virtual file system and are both stored using a single LUN 1 in the storage system. In at least some implementations, access to Vdevice 1 consumes little or no storage system resources and incurs little or no performance penalty due to COFW processing.

Figure 8:
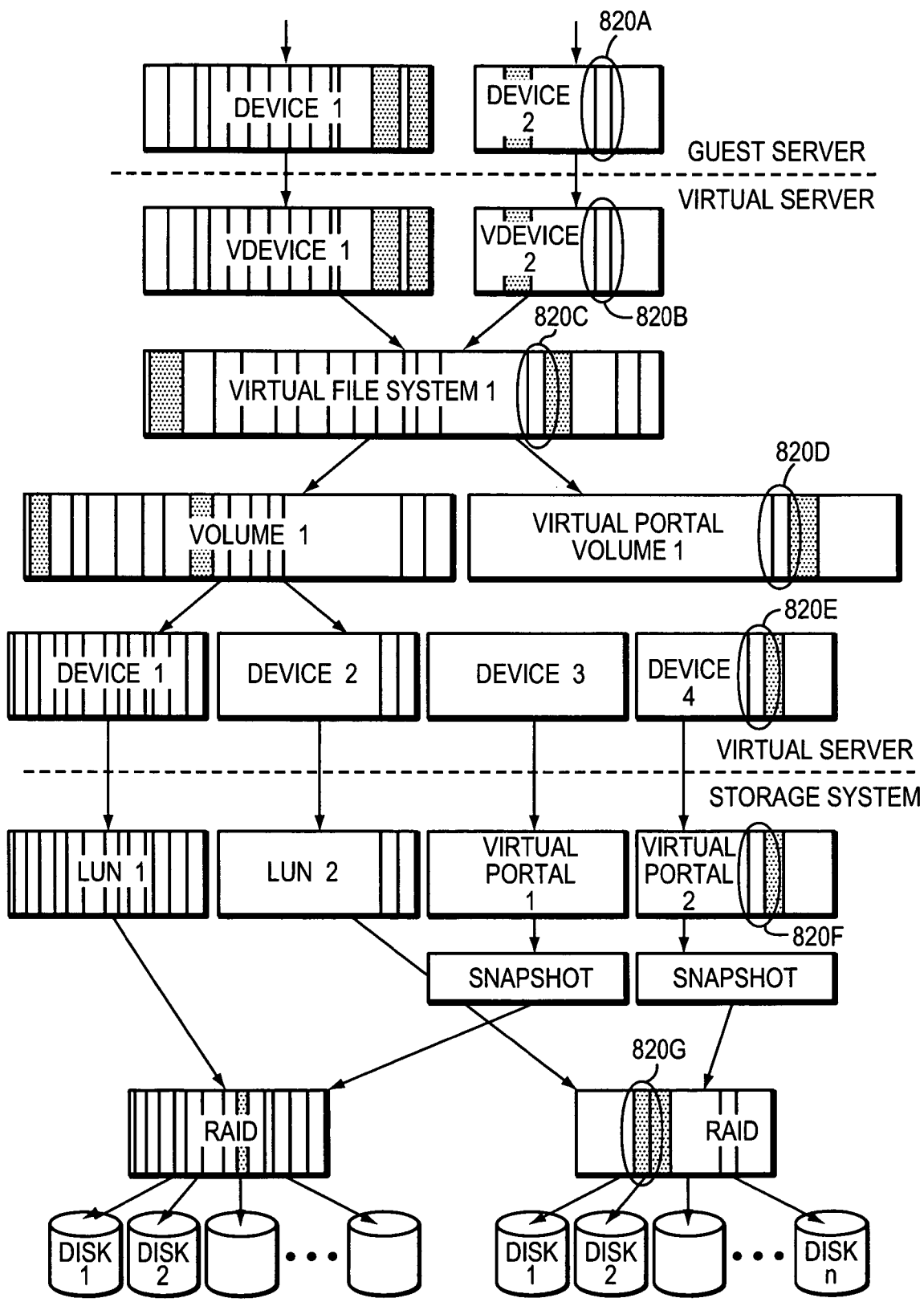

FIG. 8 depicts a multi-LUN replication example including a structure in which more than one LUN on the block storage system is used by the virtual server to store data for Virtual File System 1 (LUN 1 and LUN 2). In this case a virtual LUN portal is created for each real LUN used (Virtual portal 1 and Virtual portal 2 are created). The virtual server uses a partitioning mechanism (e.g., a volume manager) for directing I/Os to LUN 1 and LUN 2 and for directing I/Os to Virtual port 1 and Virtual port 2 respectively. The volume manager creates a virtual LUN portal volume (Virtual Portal Volume 1) constructed from Virtual port 1 and Virtual port 2 and associates the volume identifier with the file representing Vdevice 1. This process allows additional LUNs and virtual LUN portals to be added without changing the files representing the virtual disk devices. Ovals 820A-820G represent the tracing of a data page in the data structures needed to support this configuration.

Server-based replica consistency methods apply without change using this mechanism (e.g., VSS, umount of file systems, Oracle hot backup mode). Some storage systems provide consistency for replication. In at least some implementations, if storage system consistency is used, and if more than one LUN on the block storage system is used, as in the example of FIG. 8, each virtual LUN portal (LUN) is put in the same consistency grouping, which follows an existing requirement to associate each LUN in a consistency grouping.

With respect to silvering, in at least some implementations, full copy replicas, such as clones and mirrors, require storage equal to the size of the storage system LUN, which is likely to be much larger than the size of the server-defined object. In order to use a full copy replica, a typical storage system requires that an initial copy be established. This copy is often referred to as silvering or a full synchronization. If the storage system performs the silvering, the entire content of the LUN is replicated; however, in at least some implementations, if the server or the virtual server performs the silvering using one or more virtual LUN portals, the silvering can be reduced to the size of the server-defined data object. This reduction can be particularly useful if the LUN is large and the replica is on a remote storage system a long distance from the source storage system. In at least some cases, if the reduced version is used, the storage system must be instructed to avoid the initial silvering when the full copy replica is first created (if the storage system has the capability). In at least some cases, after the initial silvering, a full copy replica mechanism allows incremental updates which can be performed optimally by the block storage system without any server involvement.

With respect to replica recovery, a block storage system typically offers data recovery from a local replica. Clone reverse synchronization and snapshot rollback are examples of storage system recovery mechanisms. Data object alignment and replica extent alignment were noted above. In at least some implementations, as long as no two server-defined data objects pages co-exist on the same replica extent, block storage based replica recovery can be performed using the virtual LUN portal associated with the LUN within which the data objects reside. For example, in such implementations, if data from two different server-defined data objects were in the same extent, and the storage system were instructed to perform a replica recovery on one of the data objects (using the associated virtual LUN portal), it would copy the entire extent back to the source LUN. In such a case it would include a piece of data from a different server-defined object that was not intended for recovery, which would cause a data corruption of the other server-defined data object sharing the extent.

With respect to other considerations, in at least some cases, LUNs presented to servers are a scarce resource. Since SCSI block protocol may allow for only 255 LUNs per controller in at least some cases, it may be disadvantageous in such cases to add LUNs in the guise of virtual LUN portals. Techniques may be used to help avoid using up LUNs. For example, a vendor specific SCSI read and write protocol may be deployed which uses reserved fields to include the virtual LUN portal LUN. In this manner, the server, virtual server, or NAS storage system may have only the underlying LUN exposed to it and may tag I/Os destined for virtual LUN portals using the reserved fields in the SCSI I/O requests. In such cases, the storage system may be enhanced to take advantage of this vendor specific I/O request to redirect the I/O to the specified virtual LUN portal such that the desired replication may be performed.

Virtual LUN portal functionality may be used in or with any block-based data storage system, such as a CLARiiON® data storage system available from EMC Corporation of Hopkinton, Mass., and/or or a storage processor based data storage system as described in copending U.S. patent application Ser. No. 11/387,129 entitled METHODS, SYSTEMS, AND COMPUTER PROGRAM PRODUCTS FOR MAPPED LOGICAL UNIT (MLU) REPLICATION, STORAGE, AND RETRIEVAL IN A REDUNDANT ARRAY OF INEXPENSIVE DISKS (RAID) ENVIRONMENT, filed Mar. 22, 2006, Ser. No. 11/387,129, which is assigned to the same assignee as the present invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, one or more of the techniques described above may be used with any type of data storage system in which a single set of data storage resources is mapped or organized in multiple different ways, such as in a first way defined within the data storage system and in a second way defined externally.

What is claimed is:

1. A system for use in enhancing access to data storage, comprising:

a data storage system having a system memory used within a computer system;

a logical volume defining a set of block based data storage resources in the data storage system, the logical volume being presented as a first volume providing a first path to the logical volume, wherein I/O requests directed to the first volume are sent through the first path to the logical volume;

a first virtual logical unit number (LUN) portal mechanism serving as a first alias for the first volume, the first virtual LUN portal mechanism being presented as a second volume providing a second path to the same logical volume, wherein I/O requests directed to the second volume are sent through the second path to the same logical volume;

a second virtual LUN portal mechanism serving as a second alias for the first volume, the second virtual LUN portal mechanism being presented as a third volume providing a third path to the same logical volume, wherein I/O requests directed to the third volume are sent through the third path to the same logical volume;

a first block based data manipulation mechanism associated with the second path configured to apply a first replication feature to a first I/O request sent through the second path and a second block based data manipulation mechanism associated with the third path configured to apply a second replication feature to a second I/O request sent through the third path, wherein the first and second block based data manipulation mechanisms are not configured to apply the first or second replication features to a third I/O request sent through the first path, wherein the first I/O request sent through the second path and the second I/O request sent through the third path create an independent storage system replication separate from the first logical volume, wherein absent application of the first and second block based data manipulation mechanisms the second volume and the third volume presents a same resultant storage as the first volume; and wherein the first I/O request, the second I/O request, and the third I/O request utilize the same defined set of block based data storage resources.

2. The system of claim 1, wherein data contained within the first volume is replicated without any reference to server-defined data objects it contains.

3. The system of claim 1, wherein the first virtual LUN portal mechanism corresponds to a server-defined data object that has an I/O service level requirement.

4. The system of claim 1, wherein I/O traffic to a server-defined data object contained within the first volume is distinguished from I/O traffic to the first volume that is not associated with the server-defined data object.

5. The system of claim 1, wherein the first virtual LUN portal mechanism allows a Network Attached Storage (NAS) device to use a block-based back-end storage system for both files and disk devices.

6. The system of claim 1, wherein a virtual server maps disk devices into a common file system for each guest operating system that uses the virtual server, and at least one of the disk devices corresponds to the first virtual LUN portal mechanism.

7. The system of claim 1, wherein a virtual server system represents virtual LUNs to a guest operating system using a special purpose file system within a virtual server operating system, and at least one of the virtual LUNs corresponds to the first virtual LUN portal mechanism.

8. The system of claim 1, wherein a virtual server layer maintains virtual disk devices as files, and at least one of the files corresponds to the first virtual LUN portal mechanism.

9. The system of claim 1, further comprising:

an alignment mechanism for use in aligning I/O access to a server-defined data object on a multiple of a LUN extent size, the server-defined data object corresponding to the first virtual LUN portal mechanism.

10. The system of claim 1, wherein the first virtual LUN portal mechanism interoperates as a LUN when accessed outside the storage system.

11. The system of claim 1, wherein the first virtual LUN portal mechanism has a unique identifier.

12. The system of claim 1, wherein the first virtual LUN portal mechanism has a LUN number.

13. The system of claim 1, wherein the first virtual LUN portal mechanism is LUN masked and assigned to any storage system attached server.

14. The system of claim 1, wherein the first virtual LUN portal mechanism inherits LUN properties from the first volume.

15. The system of claim 1, wherein the first virtual LUN portal mechanism has mirror and snapshot replication enabled and the second virtual LUN portal mechanism has clone replication enabled.

16. The system of claim 1, wherein replication using the first virtual LUN portal mechanism is limited to databases.

17. The system of claim 1, wherein a virtual server associates a disk device with a file such that any I/O requests sent to the disk device are sent to the first virtual LUN portal mechanism.

18. The system of claim 1, wherein performance analysis is accomplished for the second volume independently from the first volume.

19. The system of claim 1, wherein copy on first writes (COFWs) only occur on data pages written through the first virtual LUN portal mechanism.

20. The system of claim 1, wherein:

first and second virtual devices are in a shared virtual file system and are stored using the first volume;

the first virtual device corresponds to the first virtual LUN portal mechanism, and thereby uses storage system replication; and the second virtual device does not correspond to the first virtual LUN portal mechanism, and does not use storage system replication.

21. The system of claim 1, wherein a volume manager derives a virtual LUN portal volume from the first virtual LUN portal mechanism and the second virtual LUN portal mechanism.

22. The system of claim 1, wherein the first virtual LUN portal mechanism and the second virtual LUN portal mechanism are put in a same consistency grouping.

23. The system of claim 1, wherein the first virtual LUN portal mechanism is used to perform silvering at a size of a server defined data object.

24. The system of claim 1, wherein, after an initial silvering, a full copy replication mechanism allows incremental updates which can be performed by the system without server involvement.

25. The system of claim 1, wherein, as long as no two server-defined data objects pages co-exist on a same replica extent, block storage based replica recovery can be performed using the first virtual LUN portal mechanism.

26. The system of claim 1, wherein a vendor specific SCSI read and write protocol is deployed which uses reserved fields to include the second volume.

27. The system of claim 1, wherein I/O requests destined for the first virtual LUN portal mechanism are tagged using reserved fields in the I/O requests.

28. The system of claim 1, wherein the system uses a vendor specific I/O request to redirect the first I/O request to the first virtual LUN portal mechanism.

* * * * *